Dec. 8, 1942.   J. HULMAN ET AL   2,304,096
FLUID SYSTEM PRESSURE BOOSTER
Filed Aug. 6, 1941   2 Sheets-Sheet 1

INVENTORS
JULIUS HULMAN
BERNARD BEAMAN

Dec. 8, 1942.  J. HULMAN ET AL  2,304,096
FLUID SYSTEM PRESSURE BOOSTER
Filed Aug. 6, 1941  2 Sheets-Sheet 2

INVENTORS
JULIUS HULMAN
BERNARD BEAMAN
BY
ATTORNEYS

Patented Dec. 8, 1942

2,304,096

UNITED STATES PATENT OFFICE 2,304,096

FLUID SYSTEM PRESSURE BOOSTER

Julius Hulman and Bernard Beaman, Dayton, Ohio

Application August 6, 1941, Serial No. 405,673

1 Claim. (Cl. 123—174)

(Granted under the act of March 3, 1883, as amended April 30, 1928; 370 O. G. 757)

The invention described herein may be manufactured and used by or for the Government for governmental purposes, without payment to us of any royalty thereon.

This invention relates to pressure boosters and is applicable to any fluid system wherein a fluid is moved against a resistance.

The resistance may comprise no more than the friction encountered by the fluid in moving through the system, or it may include additional resistances, but in any event some pressure or head creating means is required at some part of the system to maintain flow.

Whatever the form that such pressure creating instrumentality may take, there will be a difference in pressure, as between the upstream and downstream side thereof, in the system, such difference usually being greater as the resistance to be overcome is higher.

Such pressure difference is, of course, a function of a fluid system of this character, but there are many instances where the pressure drop on the low side is so great as to be highly objectionable, such for example as when the suction head, due to lift or equivalent frictional resistance, approaches the stage where a liquid cavitates at the suction side of a pump.

It is therefore an object of this invention to provide means which may be incorporated in a fluid system of the general class above mentioned, and which will have the effect of raising the pressure at points where it may become undesirably low.

Another object is to provide a device of this kind which may be added to a conventional fluid system with little or no difficulty in installation.

Other objects and advantages and meritorious features will become evident as the following detailed description is read with reference to the drawings, wherein.

Figure 1:
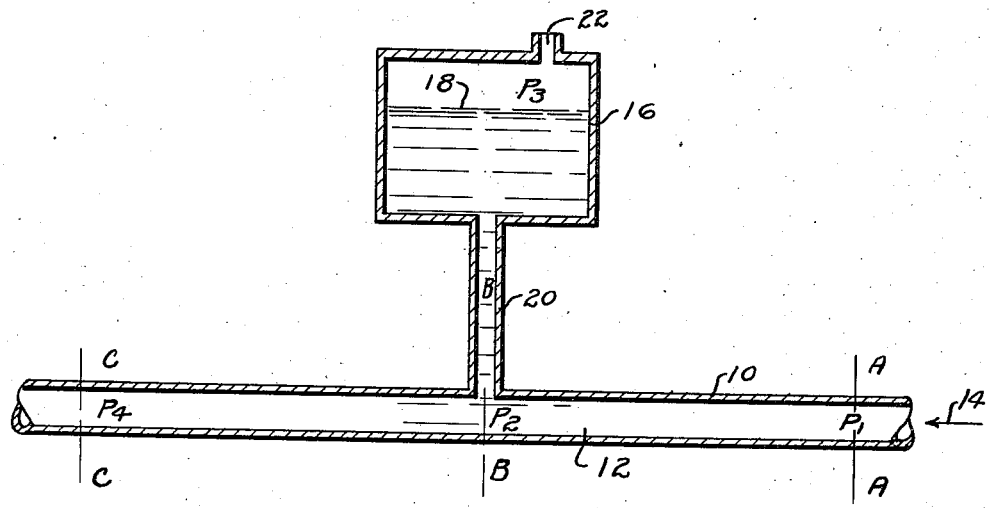
Figures 1 and 2 are diagrammatic illustrations included only to facilitate description of the principles of the invention.

In Figure 1, which shows diagrammatically a portion of a conventional fluid system to which the improved features of this invention have not been applied, a pipe 10 contains a fluid 12 moving in the direction indicated by the arrow 14. A tank 16, filled with the fluid to the level 18 is connected to the pipe 10 by a conduit 20. The tank may preferably be vented at 22.

In Figure 1, $P_1$ is the pressure within the pipe 10 measured upstream of the tank connection as at A—A; $P_2$ the pressure within the pipe 10 measured at the tank connection as at B—B; $P_3$ the pressure within the tank 16; and $P_4$ the pressure within the pipe 10 measured downstream of the tank connection as at C—C.

Figure 2:
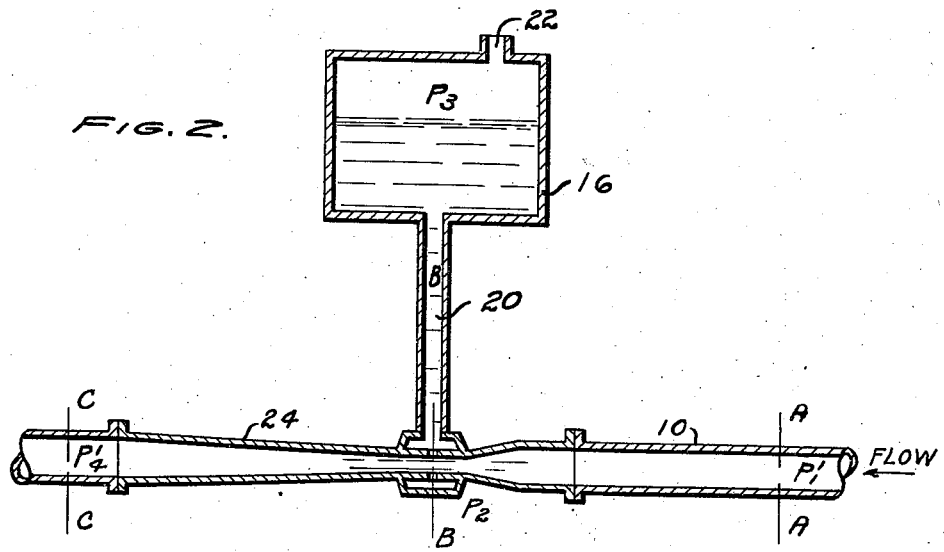

In Figure 2, which is a diagrammatic illustration of the apparatus Figure 1, but modified to illustrate the subject matter of the invention, the same pipe 10, tank 16, and conduit 20 are used, the pressure $P'_1$, $P_2$, and $P'_4$ being taken at the same sections, namely, A—A, B—B and C—C.

The modification consists in removing a portion of the pipe 10 and replacing it with a venturi 24, the tank 16 being connected by the conduit 20 into the throat of the venturi. Since the throat pressure $P_2$ and the tank pressure $P_3$ are still the same as they are in the arrangement Figure 1, the pressures $P'_1$ and $P'_4$ will be higher, this being an inherent function of venturi which is well understood.

The tank 16 may be assumed to be included in a fluid circulating system from which no part of the fluid is intentionally removed as an expansion tank in a cooling system, or, it may be so connected in a system as to bypass any part of the fluid from the high to the low pressure side of the system, or it may serve in both these capacities. The tank may also be used as a source of supply in a system from which fluid is gradually removed and used, as, for instance, in a fuel system for an internal combustion engine, or a combination of the several functions may be included in a single system.

In Figures 1 and 2 the tank 16 is shown as being vented to atmosphere through the opening 22 but it will be obvious that this vent may be connected to a source of pressure which may be above or below atmospheric pressure.

Referring again to Figure 1, and assuming that there is no flow from the tank 16 to the pipe 10, $P_2$ is equal to $P_3$ plus the head or equivalent head of the fluid above the pipe. A tank connection being necessary, it is made at the low pressure point in the system. If flow is in the direction of the arrow 14, $P_1$ is greater than $P_2$ and $P_3$ is greater than $P_4$, the pressure loss being due to the flow of fluid in pipe 10. If the sections A—A and C—C are at considerable distance apart, the pressure $P_4$ may be considerably less than $P_2$.

This gradual pressure drop is a function of a system of this character, and must be compensated for, if circulation is to continue, by some form of pressure raising means, usually a pump. Under some conditions of operation this presents no difficulty, being merely a matter of providing a pump of sufficient capacity to raise the pressure the desired amount.

Under other circumstances, however, the operating characteristics of the pump are considerably affected by a low pressure $P_4$ at the inlet side of the pump, as for instance when pumping a liquid and $P_4$ falls so low that the liquid boils at the pump inlet.

Referring now to Fig. 2, $P_2$ is equal to $P_3$ plus the head, just as it is in Figure 1. Fluid flow through a venturi, however results in an increase in the velocity, and a consequent lowering of the pressure in the Venturi throat, the throat pressure being always less than the pressure at points just before entering and after passing through the venturi. It follows that, since the throat pressure $P_2$ is the same in Figure 2 as in Figure 1, the pressures $P'_1$ and $P'_4$ in Figure 2 are respectively greater than the pressures $P_1$ and $P_4$ in Figure 1. Therefore by connecting a tank and feed pipe of a given pressure $P_3$ into the throat of a venturi 24, Figure 2, instead of directly into the pipe 10, Figure 1, all other points in the system, Figure 2, have their pressures raised an amount corresponding to the differences between the pressures $P_1$ and $P_4$ of Figure 1 and $P'_1$ and $P'_4$ of Figure 2.

In applications in which there is no flow from the tank 16 into the pipe 10, $P_2$ is equal to $P_3$ plus whatever head is provided by the elevation of the liquid level in the tank above the pipe. However, in an installation in which fluid is diverted from the pipe 10 of the system upstream of the tank connection and returned to the tank, flow will occur between the tank and pipe. This flow will naturally lower the pressure $P_2$ somewhat, but the pressure decrement may be kept to a small value by using as large a pipe 20 as practicable.

The foregoing description is intended to cover the improved pressure booster generally. However, with a view of more clearly describing the principles involved, and without intent to place any limitation on its application, several specific embodiments of the invention had preferably be described.

Figure 3:
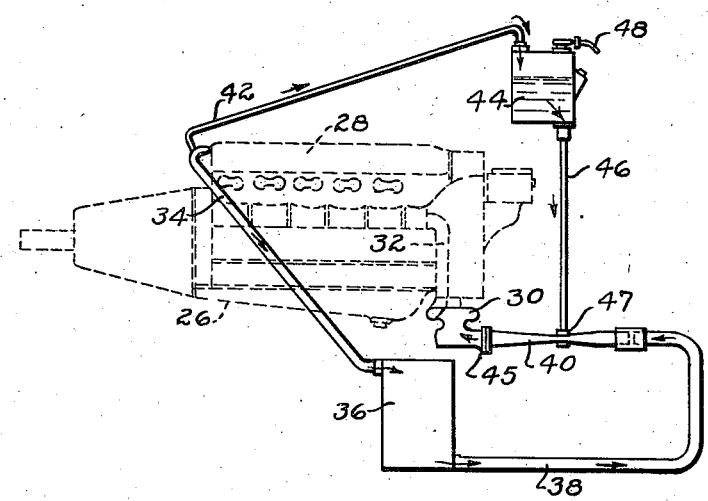
Figure 3 shows an application of the invention to the cooling system of an internal combustion engine.

The exemplification appearing in Figure 3 relates to a cooling system for an internal combustion engine or its equivalent, and comprises an engine 26 having a cooling jacket 28 and a pump 30 for circulating the coolant. Principal circulation is from pump 30 through pipe 32 through jacket 28, pipe 34 air cooled radiator 36, pipe 38, and venturi 40 to the pump inlet 45.

Auxiliary circulation is from a high point in the main system through pipe 42, expansion tank 44, and pipe 46 to the throat 47 of the venturi. The expansion tank 44 is vented to the atmosphere at 48 so that the pressure at the Venturi throat is fixed by the height of the level of the coolant in the expansion tank above the Venturi throat.

Without the venturi, the pressure at the pump inlet 45 would be the same as the pressure at the bottom of pipe 46. With the addition of the venturi as shown, the pressure at the pump inlet 45 may be considerably higher than that at the bottom of pipe 46. The desirability of raising the pressure at the inlet side of the pump in a system of the kind is well understood.

While one specific embodiment of the invention has been shown and described, and its superiority noted, it will be apparent that the invention may be employed to good advantage in substantially any circulating fluid system where it is desirable to raise the pressure on the low pressure side of the circuit, which will be at the intake of the pressure producing means. This pressure rise is accomplished with little change in conventional practice and the necessary addition includes no moving parts, nor does it add to the power required to operate the system.

Throughout the specification and claim we have used the word "venturi," but it will be understood that this term is to be construed in its broader sense to include any device having its passageway restricted at one part to cause increased rate of flow and a consequent lowered pressure in the restricted part.

So, also, the term "throat" when applied to a venturi or its equivalent should be construed to include any connection near enough to the throat to get the benefit of the increased flow and lowered pressure.

We claim:

A cooling system for an engine, comprising a coolant jacket for said engine, a coolant pump, a pipe connecting the discharge side of the pump to the lower end of said jacket, a radiator below said jacket, a pipe connecting the upper side of said jacket to the upper side of said radiator, means containing a channel connecting the lower side of said radiator to the inlet side of said pump, said connecting means including a venturi, an expansion tank above said jacket, a conduit connecting the bottom of said expansion tank to the throat of the venturi, and a conduit connecting the upper side of said jacket to the upper side of said expansion tank.

JULIUS HULMAN.
BERNARD BEAMAN.